US009537363B2

(12) United States Patent
Thompson et al.

(10) Patent No.: US 9,537,363 B2
(45) Date of Patent: Jan. 3, 2017

(54) ELECTRIC MOTOR-DRIVEN COMPRESSOR HAVING AN ELECTRICAL TERMINAL BLOCK ASSEMBLY

(71) Applicant: Honeywell International Inc., Morristown, NJ (US)

(72) Inventors: Glenn F. Thompson, Palos Verdes Estates, CA (US); Patrick Beresewicz, La Mirada, CA (US); Mike Guidry, Redondo Beach, CA (US); John Mason, Torrance, CA (US); Rick Johnson, Torrance, CA (US)

(73) Assignee: Honeywell International Inc., Morris Plains, NJ (US)

( * ) Notice: Subject to any disclaimer, the term of this patent is extended or adjusted under 35 U.S.C. 154(b) by 297 days.

(21) Appl. No.: 14/265,664

(22) Filed: Apr. 30, 2014

(65) Prior Publication Data
US 2015/0318750 A1    Nov. 5, 2015

(51) Int. Cl.
H02K 11/00    (2016.01)
H02K 3/28    (2006.01)
(Continued)

(52) U.S. Cl.
CPC ............. *H02K 3/28* (2013.01); *F04D 25/0693* (2013.01); *F04D 29/624* (2013.01); *H02K 5/225* (2013.01);
(Continued)

(58) Field of Classification Search
CPC ........... H02K 5/225; H02K 3/28; H02K 15/04
(Continued)

(56) References Cited

U.S. PATENT DOCUMENTS 2,267,262 A    12/1941 Bast
4,068,612 A    1/1978 Meiners
(Continued)

FOREIGN PATENT DOCUMENTS

CN    103 490 559 A    1/2014
DE    10 2008 054265 A1    5/2010
(Continued)

OTHER PUBLICATIONS

Extended European Search Report from corresponding European Patent Application No. 15153719.8 dated Jul. 6, 2015.
(Continued)

*Primary Examiner* — Hanh Nguyen
(74) *Attorney, Agent, or Firm* — Alston & Bird LLP

(57) ABSTRACT

An electric motor-driven compressor having an electrical terminal block assembly and corresponding method of assembly are provided. The electrical terminal block assembly includes a base plate that has a staging feature for receiving a lug end of a motor stator cable prior to connection of the motor stator cable with a terminal bar of the terminal block assembly. In this way, once the terminal block assembly is lowered into the enclosure and the motor stator cable is no longer visible to the user, a stator cable fastener may be passed through a stator cable mounting hole in the terminal bar to engage the stator cable lug that is being held in the proper position by the staging feature of the base plate. Upon rotation of the stator cable fastener, the stator cable lug may be drawn into conductive engagement with the terminal bar.

10 Claims, 12 Drawing Sheets

(51) Int. Cl.
  *F04D 25/06* (2006.01)
  *F04D 29/62* (2006.01)
  *H02K 5/22* (2006.01)
  *H02K 15/04* (2006.01)

(52) U.S. Cl.
  CPC ........... *F05D 2220/40* (2013.01); *H02K 15/04* (2013.01); *Y10T 29/49011* (2015.01)

(58) Field of Classification Search
  USPC .......................................................... 310/71
  See application file for complete search history.

(56) References Cited

U.S. PATENT DOCUMENTS

| | | | |
|---|---|---|---|
| 5,020,319 | A | 6/1991 | Matsuura et al. |
| 6,422,838 | B1 | 7/2002 | Sloteman |
| 8,317,494 | B2 * | 11/2012 | Pileski .................... F01C 21/10 310/71 |
| 8,348,640 | B2 * | 1/2013 | Marioni ................. F04D 25/082 310/58 |
| 2003/0059315 | A1 | 3/2003 | Choi et al. |
| 2004/0179947 | A1 | 9/2004 | Agrawal et al. |
| 2007/0052307 | A1 * | 3/2007 | Yoshida ................. H02K 5/225 310/71 |
| 2008/0223557 | A1 | 9/2008 | Fulton et al. |
| 2008/0268695 | A1 | 10/2008 | Dieterle et al. |
| 2008/0273990 | A1 | 11/2008 | Pham et al. |
| 2011/0243762 | A1 | 10/2011 | Daikoku et al. |
| 2013/0207494 | A1 * | 8/2013 | Patel ...................... H02K 5/225 310/71 |
| 2013/0257201 | A1 * | 10/2013 | Lemke ................... H02K 5/225 310/71 |

FOREIGN PATENT DOCUMENTS

| | | |
|---|---|---|
| DE | 10 2008 059002 A1 | 7/2010 |
| EP | 1 479 335 A2 | 11/2004 |
| EP | 2 910 789 | 8/2015 |
| FR | 2 982094 A1 | 5/2013 |
| GB | 2 335 710 A | 9/1999 |
| GB | 2 427 248 A | 12/2006 |
| JP | 2007 159179 A | 6/2007 |
| WO | WO 00/49296 A1 | 8/2000 |
| WO | WO 2004/063535 A1 | 7/2004 |
| WO | WO 2006/005355 A1 | 1/2006 |
| WO | WO 2011/066981 A2 | 6/2011 |

OTHER PUBLICATIONS

European Search Report for Application No. EP 15 16 3723 dated Jan. 6, 2016.
European Search Report for Application No. EP 15 16 3597 dated Sep. 25, 2015.
European Search Report for Application No. EP 15 15 8472 dated Sep. 24, 2015.
U.S. Appl. No. 14/226,309, filed Mar. 26, 2014, In re: Thompson et al., entitled *Electric Motor-Driven Compressor Having a Heat Shield Form a Wall of a Diffuser*.
U.S. Appl. No. 14/184,122, filed Feb. 19, 2014, In re: Thompson et al., entitled *Sealing Arrangement for Fuel Cell Compressor*.
U.S. Appl. No. 14/264,677, filed Apr. 29, 2014, In re: Thompson et al., entitled *Electric Motor-Driven Compressor Having B-Directional Liquid Coolant Passage*.

* cited by examiner

ELECTRIC MOTOR-DRIVEN COMPRESSOR HAVING AN ELECTRICAL TERMINAL BLOCK ASSEMBLY

BACKGROUND

The present invention relates to electric-assisted turbochargers or fuel cell electric motor-driven turbocompressors that have electrical terminal block assemblies for receiving electricity.

A terminal block is typically an assembly that has one or more electrical contact surfaces that are physically and electrically isolated from each other. For example, terminal bars may be retained within a non-conductive block and may be physically separated from each other by non-conductive partitions. Such terminal bars provide a way to connect two or more wires of common polarity or phase together without using a splice or other permanent physical joining technique. Further, the terminal block may serve to provide electrical isolation between wires of differing polarity or phase and/or isolation between the wires and an enclosure containing the terminal block assembly therein.

In electric-assisted turbomachinery applications, such as for electric motor-driven turbocompressors, electrical connections may be required for rotating a rotor of the compressor. For example, in a dual-stage motor-driven compressor, a low pressure compressor wheel is provided at one end of a rotor shaft, and a high pressure compressor wheel is provided at the other end of the rotor shaft. Electricity supplied to a motor stator through a terminal block causes rotation of the rotor, such that air entering the low pressure side of the dual-stage motor-driven compressor may be compressed, and compressed air from the low pressure side that has been passed to the high pressure side may be further compressed to achieve a particular pressure as required by the specific application. Thus, a terminal block may provide a way of connecting and isolating motor wires and other cabling that may be required to support the particular application.

BRIEF SUMMARY

Accordingly, an electric motor-driven compressor is provided that has an electrical terminal block assembly for receiving electricity. The electrical terminal block assembly comprises a base plate configured to receive at least one motor stator cable in electrical communication with a motor stator of the motor-driven compressor, and the motor stator cable includes a stator cable lug on an end thereof. The electrical terminal block assembly further includes a terminal block located adjacent the base plate and including at least one conductive terminal bar disposed therein, the terminal bar including at least one stator cable mount and at least one controller cable mount, and a cover located adjacent the terminal block. The base plate may further include a staging feature configured to locate the stator cable lug, and the stator cable mount may be aligned with the staging feature. The stator cable mount may be configured to receive a stator cable fastener therethrough to connect the stator cable lug to the stator cable mount. The controller cable mount may be configured to receive a controller cable in electrical communication with a motor controller, and the controller cable may include a controller cable lug on an end thereof, wherein the controller cable mount is configured to receive a controller cable fastener therethrough to connect the controller cable lug to the controller cable mount. The stator cable lug may be configured to be drawn from the staging feature into contact with terminal bar via engagement with the stator cable fastener.

In some embodiments, the cover may include a rib extending toward the terminal block, and the rib may be configured to prevent the stator cable fastener from disengaging from the stator cable lug and to prevent the controller cable fastener from disengaging from the controller cable mount. The base plate may further include at least one lug positioning feature configured to prevent the stator cable lug from rotating upon engagement with or disengagement from the stator cable fastener. The lug positioning feature may comprise a pair of substantially parallel walls configured to rotationally constrain a portion of the stator cable lug therebetween.

In some cases, the terminal block may include a channel which houses the terminal bar. Moreover, the cover may be constructed of a non-conductive material and may be waterproof. The base plate and the terminal block may be received in a terminal block enclosure comprising four sidewalls, and the cover may be configured to be affixed to at least one of the sidewalls. One of the walls of the terminal block enclosure may include at least one access port configured to receive an end of the controller cable therethrough. In some cases, the base plate may be constructed of a non-conductive material.

In other embodiments, a method of assembling an electric motor-driven compressor having an electrical terminal block assembly may be provided. The method may include affixing an enclosure of an electrical terminal block assembly proximate a motor housing of an electric motor-driven compressor, wherein the enclosure houses a base plate and a terminal block located adjacent the base plate, and wherein the base plate includes a staging feature. The method may further include routing at least one motor stator cable including a stator cable lug on an end thereof into the enclosure, wherein the at least one motor stator cable is in electrical communication with the motor of the motor-driven compressor, and mounting the stator cable lug on the staging feature of the base plate. The method may further include inserting at least one conductive terminal bar in the terminal block, such that at least one stator cable mount of the terminal block is aligned with the staging feature of the base plate and the stator cable lug, and engaging a fastener with the stator cable lug via the stator cable mount, such that the stator cable lug is drawn from the staging feature of the base plate into contact with the terminal bar.

In some cases, a cover may be attached to the enclosure, wherein the cover and the enclosure provide a waterproof, electrically insulated environment therein. The terminal bar may include a controller cable mount, and the method may further comprise inserting an end of at least one controller cable into the enclosure via an access port defined in a sidewall of the enclosure, wherein the controller cable is in electrical communication with a motor controller and includes a controller cable lug on the end thereof. The controller cable may be connected to the controller cable mount of the terminal bar via a controller cable fastener.

In some embodiments, an attachment feature of the controller cable may be secured to an outer surface of a sidewall of the enclosure. A cover may be attached to the enclosure, wherein the cover includes at least one non-conductive rib extending toward the terminal block, and wherein the rib is configured to prevent the stator cable fastener from disengaging from the stator cable lug and to prevent the controller cable fastener from disengaging from the controller cable mount. The rib may be defined by a non-conductive cover inner liner, and the method may further comprise attaching the non-conductive cover inner liner to an interior surface of the cover.

In some cases, a crimp barrel of the at least one stator cable lug may be disposed in a corresponding lug positioning feature of the base plate, wherein the lug positioning feature is configured to prevent the stator cable lug from rotating upon engagement with or disengagement from the stator cable fastener. The lug positioning feature may comprise a pair of substantially parallel walls configured to rotationally constrain a portion of the stator cable lug therebetween. The terminal block may include a channel configured to receive the terminal bar, and the base plate may be constructed of a non-conductive material.

BRIEF DESCRIPTION OF THE SEVERAL VIEWS OF THE DRAWING(S)

Having thus described the present disclosure in general terms, reference will now be made to the accompanying drawings, which are not necessarily drawn to scale, and wherein:

Figure 12:
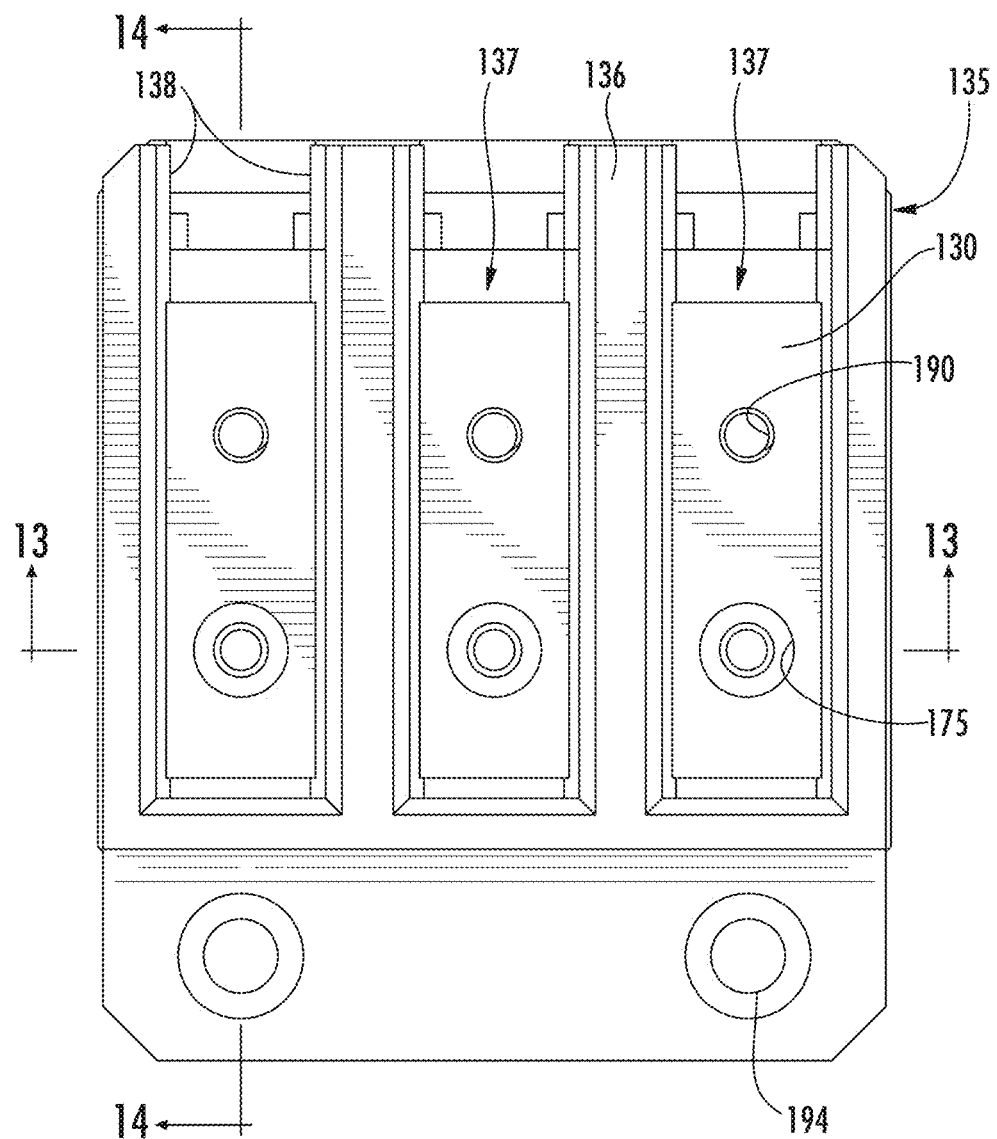
FIG. 12 is a top view of the terminal block with terminal bars inserted therein in accordance with one embodiment of the invention.
Figure 13:
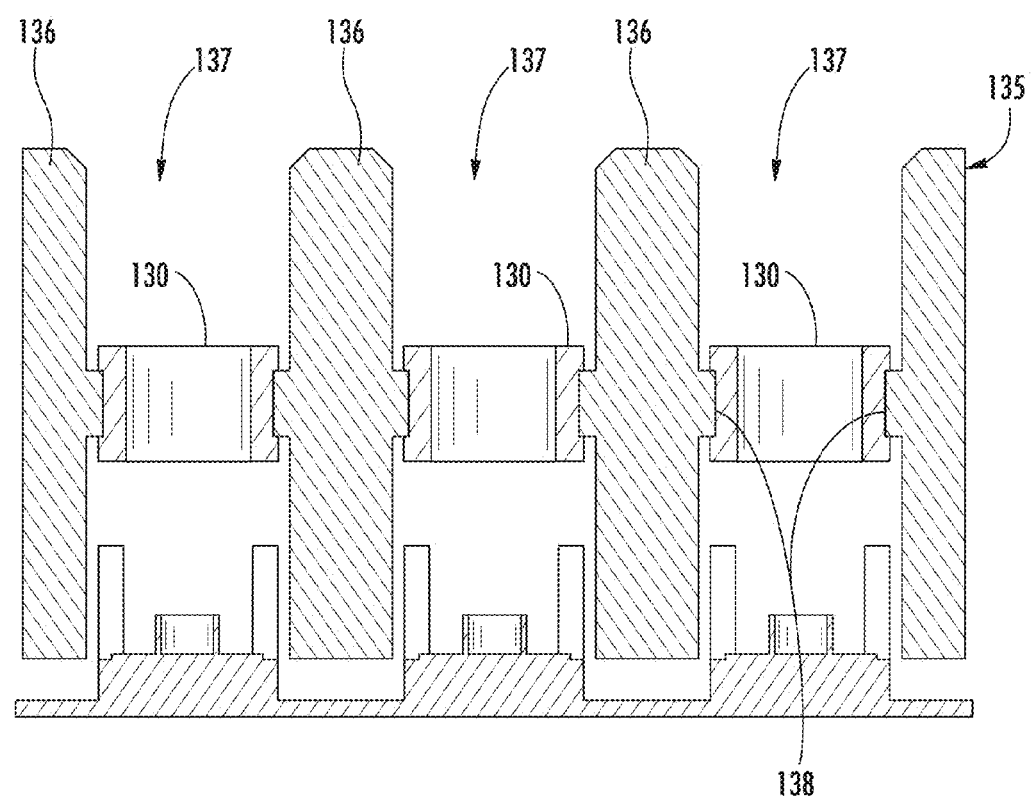
Figure 14:
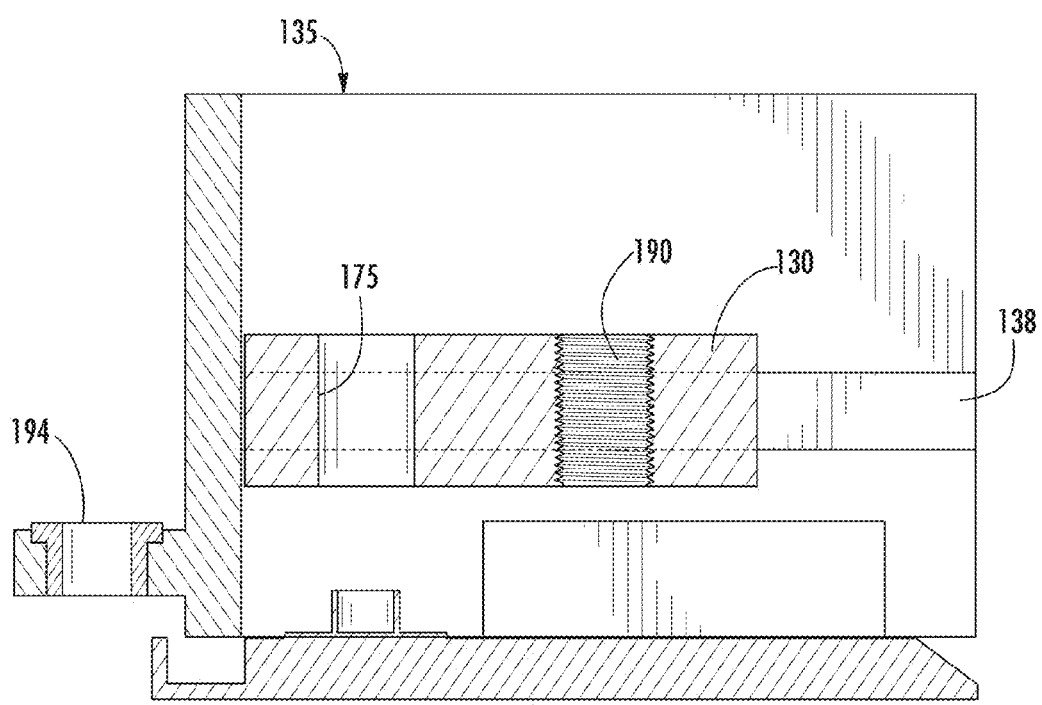

FIG. 13 is a cross-sectional view of the terminal block of FIG. 12 showing engagement of the terminal block with terminal bars that have been inserted therein in accordance with one embodiment of the invention; and FIG. 14 is a cross-sectional view of the terminal block of FIG. 12 showing engagement of the terminal block with terminal bars that have been inserted therein in accordance with one embodiment of the invention.

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
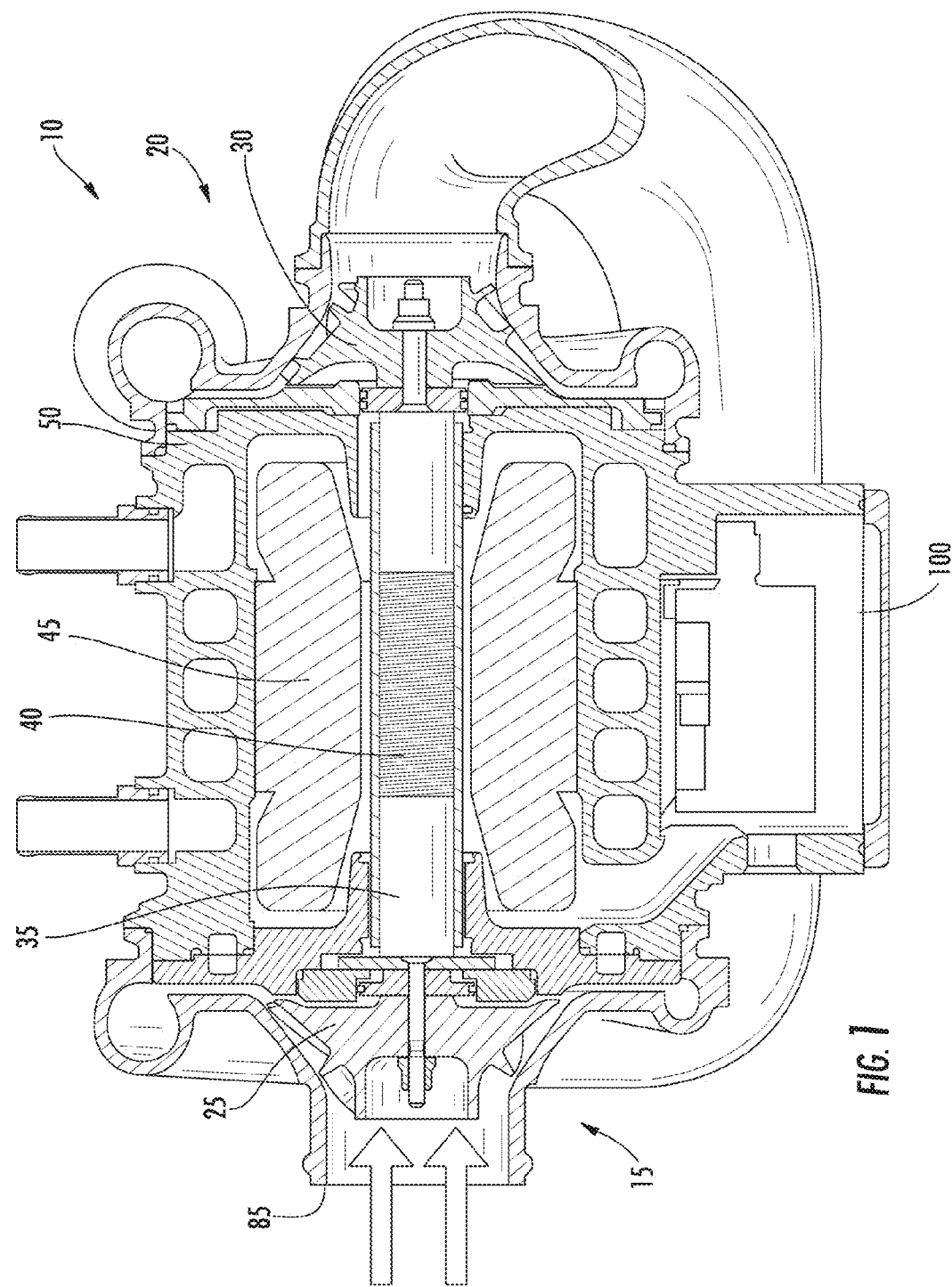
FIG. 1 is a simplified cross-sectional view of a dual-stage motor-driven compressor in accordance with one embodiment of the invention.

A simplified cross-sectional view of a dual-stage motor-driven compressor 10 for use with a fuel cell (such as a proton exchange membrane (PEM) fuel cell) is shown in FIG. 1. The dual-stage motor-driven compressor 10 may include a low pressure side 15 and a high pressure side 20 at respective ends of the compressor. The low pressure side 15 may include a compressor wheel 25 that draws in ambient air through an inlet 85 at approximately atmospheric pressure and temperature. As the compressor wheel 25 is rotated, the blades of the compressor wheel compress the ambient air to a first pressure above atmospheric pressure. This "low pressure" air is routed to the high pressure side 20 of the dual-stage motor-driven compressor 10, where another compressor wheel 30 further compresses the air to a higher second pressure above atmospheric pressure. This "high pressure" air is then fed to the cathode side of a fuel cell (not shown), where it provides oxygen for the fuel cell reaction to produce electricity.

As shown in FIG. 1, the compressor wheels 25, 30 may be attached to opposite ends of a rotating shaft, or rotor 35, and supported within a housing 50. In the case of a motor-driven dual-stage compressor, the rotor 35 may include a section having a magnet(s) 40 within or wrapped around the rotor that, in cooperation with a motor stator 45, drives the rotor. In this regard, the motor stator 45 may be opposingly disposed with respect to the rotor (e.g., spaced from and surrounding the rotor), such that an electric current (e.g., from the fuel cell) can rotate the rotor 35 and compressor wheels 25, 30 to compress the air as described above.

Electricity may be supplied to the motor stator 45 via a terminal block assembly 100 that is configured to provide electrical connections between a source (e.g., via controller cables) and the motor stator (e.g., via motor stator cables). Although the terminal block assembly 100 is shown on an underside of the housing 50 in FIG. 1 with respect to the orientation of the page, it is understood that in other configurations of the compressor 10 the terminal block assembly 100 may be disposed along the top side of the housing or in any other location depending on the configuration of the compressor and/or terminal block assembly. Indeed, in other figures referenced herein, such as in FIG. 2, the terminal block assembly 100 is shown disposed at the top side of the housing 50.

Figure 2:
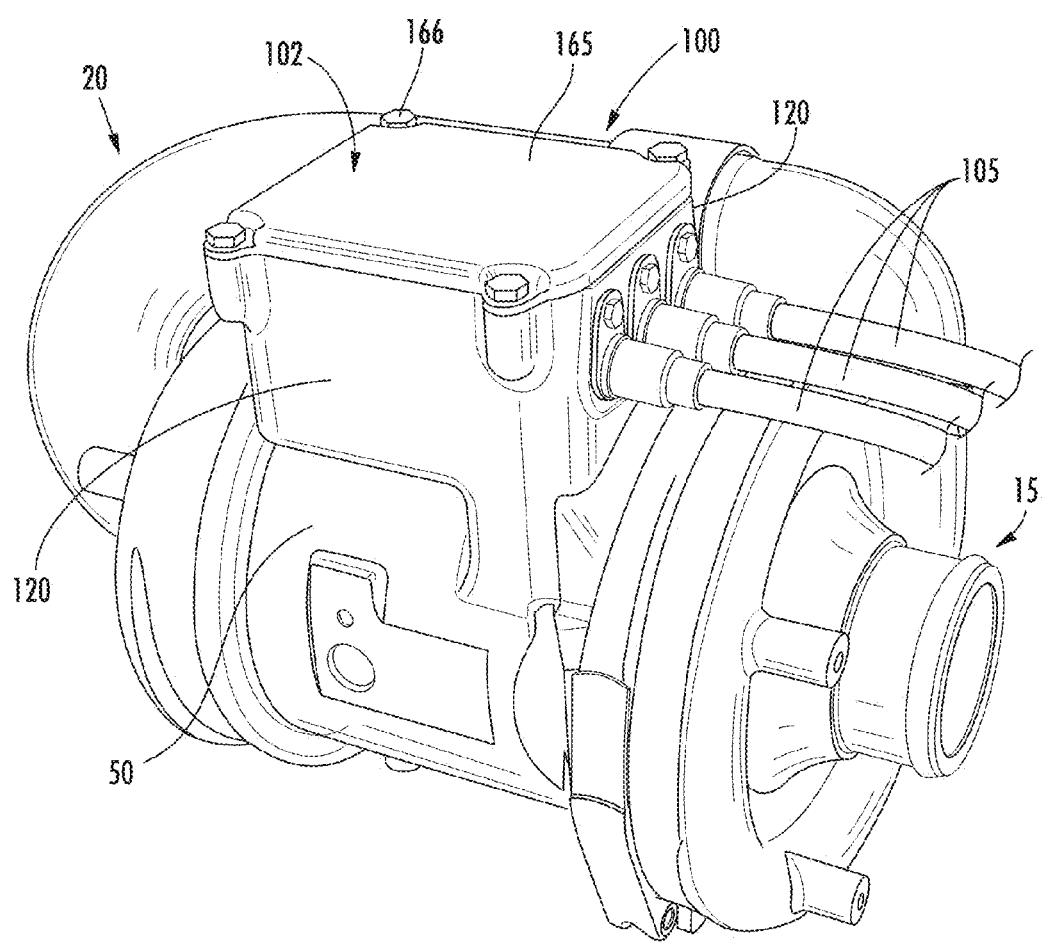
FIG. 2 is a perspective view of a dual-stage motor-driven compressor with an enclosure for a terminal block assembly attached therein in accordance with one embodiment of the invention.

With reference now to FIG. 2, the terminal block assembly 100 may comprise an enclosure 102, within which external controller cables 105 may be received and connected with motor stator cables (described below). The enclosure 102 may comprise four sidewalls 120 extending away from the motor housing 50 that are configured to engage with a cover 165 and a gasket 167 (shown in FIG. 5) to provide a waterproof, electrically insulated environment inside the enclosure for the electrical connections that are made therein. Accordingly, in some embodiments, the cover 165 may be constructed of a non-conductive and waterproof material. The cover 165 may be configured to be removable from the sidewalls 120, such that the interior of the enclosure 102 may be accessible to a user, e.g., to insert components and/or make connections between the controller cables 105 and corresponding motor stator cables. For example, the cover 165 according to some embodiments may be configured to be affixed to at least one of the four sidewalls 120, such as via one or more fasteners 166 (e.g., bolts, screws, etc.). The gasket 167 may be disposed between the cover 165 and a top edge of each of the sidewalls 120 with which the cover is engaged, such as within a groove defined in the cover, as shown in FIG. 5.

Figure 3:
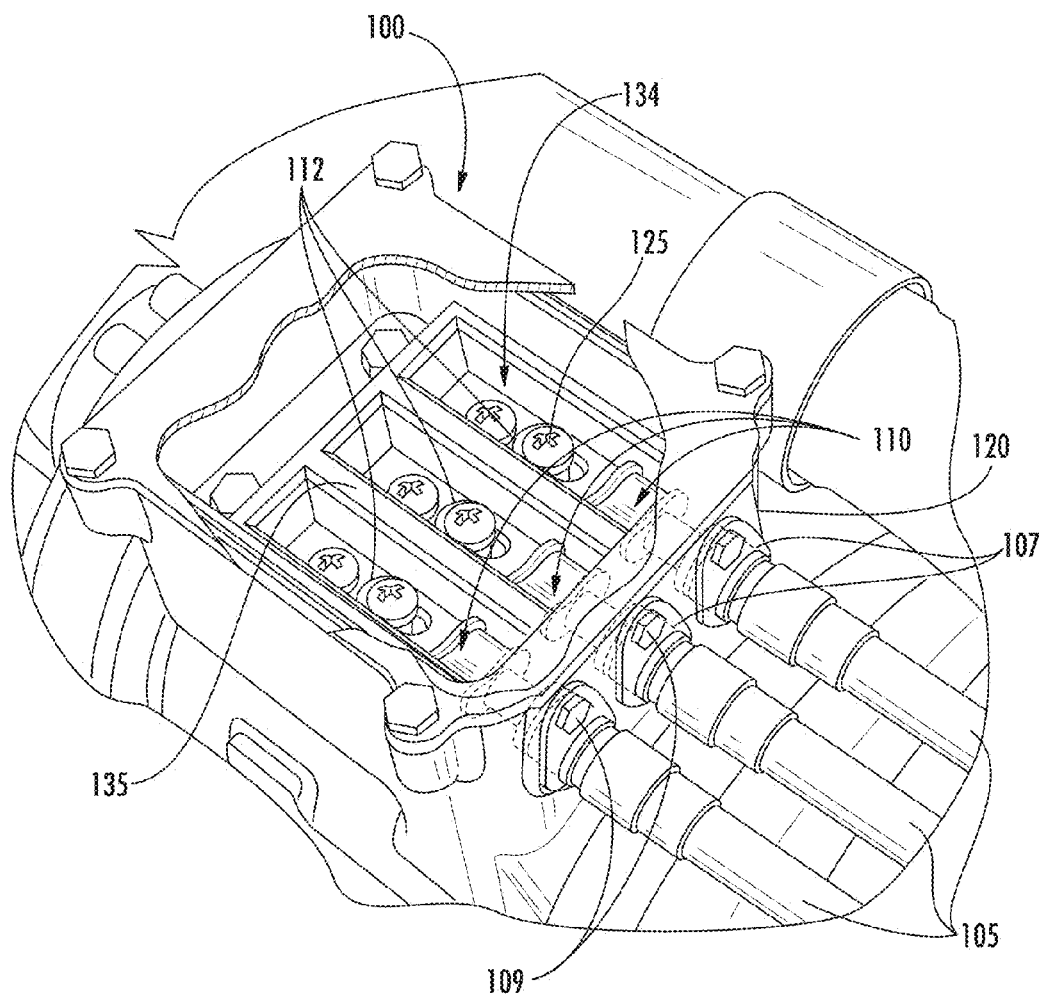
FIG. 3 is a detail perspective view of the enclosure of FIG. 2 with portions of the cover removed in accordance with one embodiment of the invention.
Figure 4:
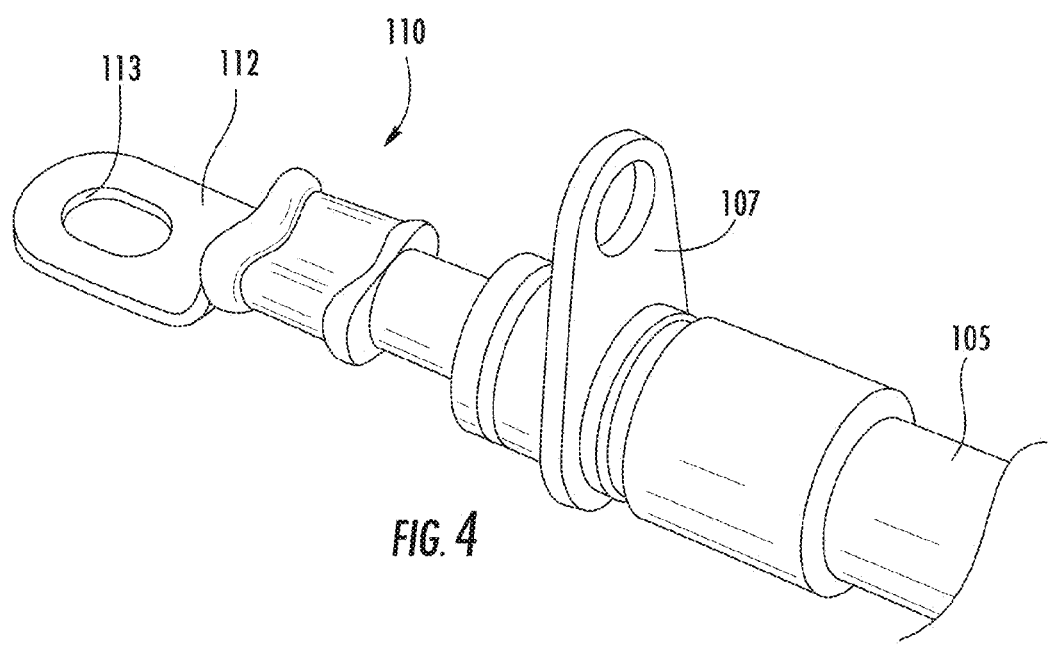
FIG. 4 is a perspective view of a controller cable with a cable lug on an end thereof in accordance with one embodiment of the invention.

According to some embodiments, the terminal block assembly 100 may be configured to allow a user to perform a blind connection between the controller cables 105 and the motor stator cables enclosed therein. For example, as shown in FIGS. 3-5 and described in greater detail below, an end 110 of each controller cable 105 may include a lug 112 that is configured to be inserted through individual access ports 115 (best shown in FIGS. 5 and 11) defined in one of the sidewalls 120 of the enclosure. The lugs 112 may be configured to be attached (e.g., via a fastener 125) to a terminal bar 130 disposed within a terminal block 135 of the terminal block assembly 100. On the other side of the terminal bar 130, as shown in FIG. 5, one or more motor stator cables 140 may be prepositioned with respect to the terminal bar, such that connection of the stator cables 140 to the terminal bar 130 via the respective lugs 155 and fasteners 170 serves to establish a connection between the controller cable 105 and a corresponding motor stator cable 140 (FIG. 5) without requiring the user to have the ability to see or manipulate the motor stator cables to bring them into the proper position, as the stator cables may be located behind and obscured by the corresponding terminal bars 130 or various other components of the terminal block assembly 100, as described below.

Figure 5:
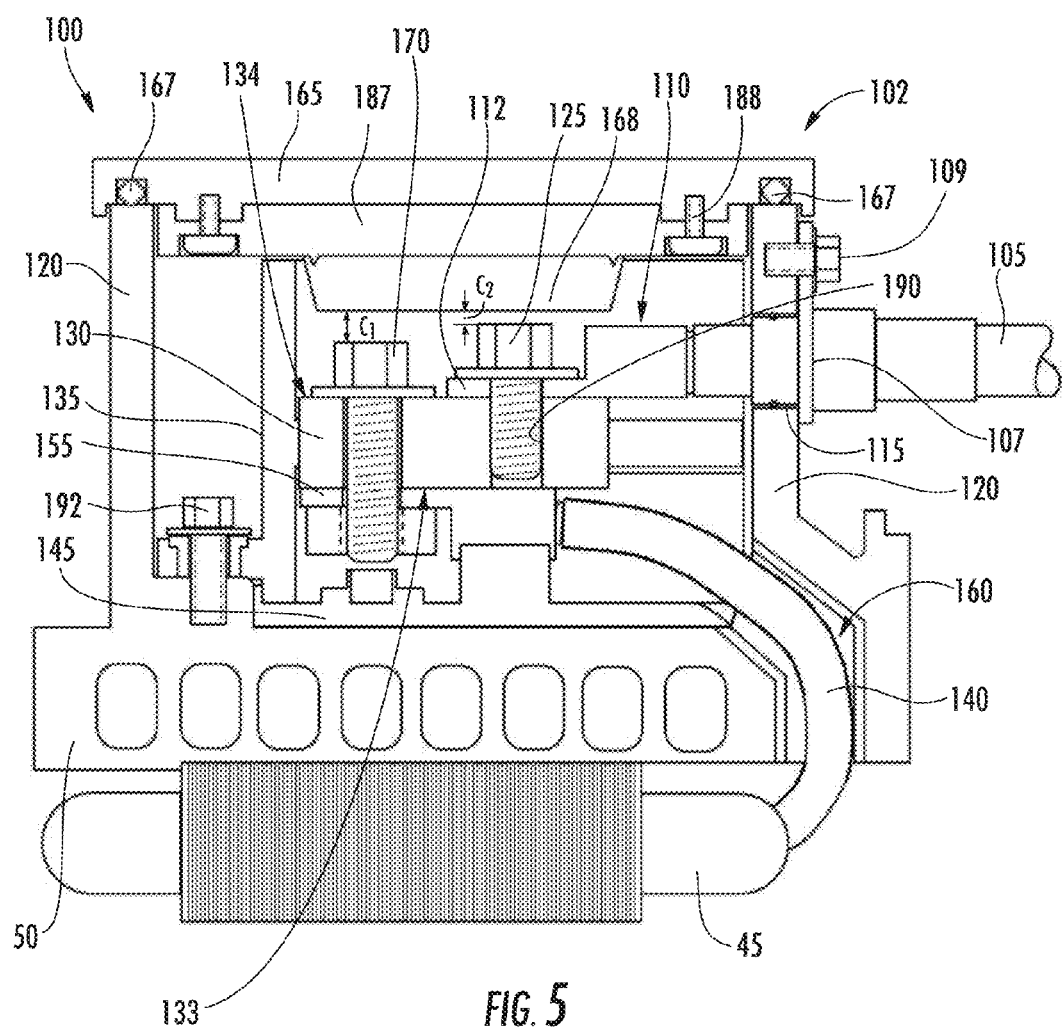
FIG. 5 is a cross-sectional view of the terminal block assembly of FIG. 2 in accordance with one embodiment of the invention.

FIG. 5 shows a cross-section of the terminal block assembly 100. As illustrated in FIG. 5, embodiments of the terminal block assembly 100 include a base plate 145 that is housed within the enclosure 102 and is configured to receive at least one motor stator cable 140 that is in electrical communication with a motor stator 45 of the motor-driven compressor. In this regard, the base plate 145 may be constructed of a non-conductive material, such as a plastic material. Moreover, in some embodiments, the base plate 145 may include one or more features that are configured to hold the motor stator cables 140 in position for subsequent engagement with the terminal bar 130 (e.g., staging the motor stator cables for later connection). For example, each motor stator cable 140 may be configured to engage one or more of the features of the base plate 145 during assembly of the terminal block assembly 100, such that the base plate 145 holds each motor stator cable 140 in a staged manner until the electrical connection of the motor stator cable with the terminal bar 130 of the terminal block assembly 100 is completed.

Figure 5A:
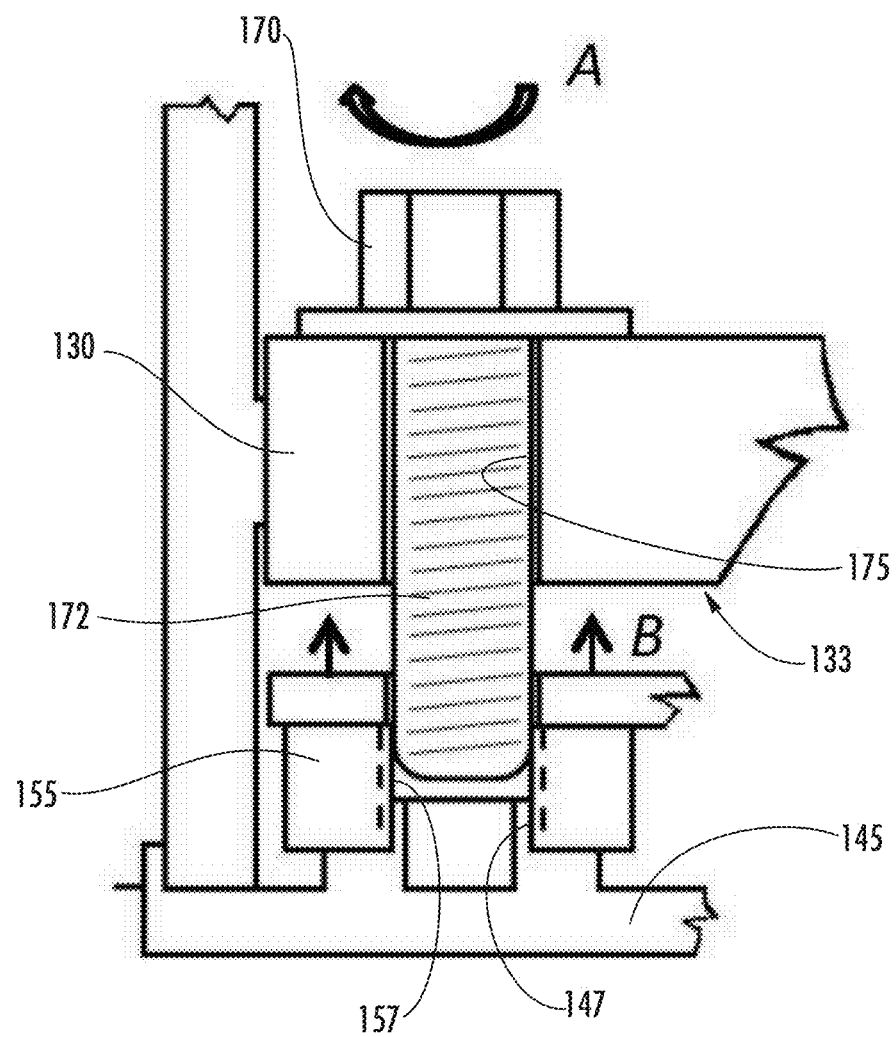
FIG. 5A is a detail cross-sectional view of a portion of a base plate and terminal bar of FIG. 5 in a staged configuration, prior to connecting the stator cable lug with the terminal bar in accordance with one embodiment of the invention.
Figure 6:
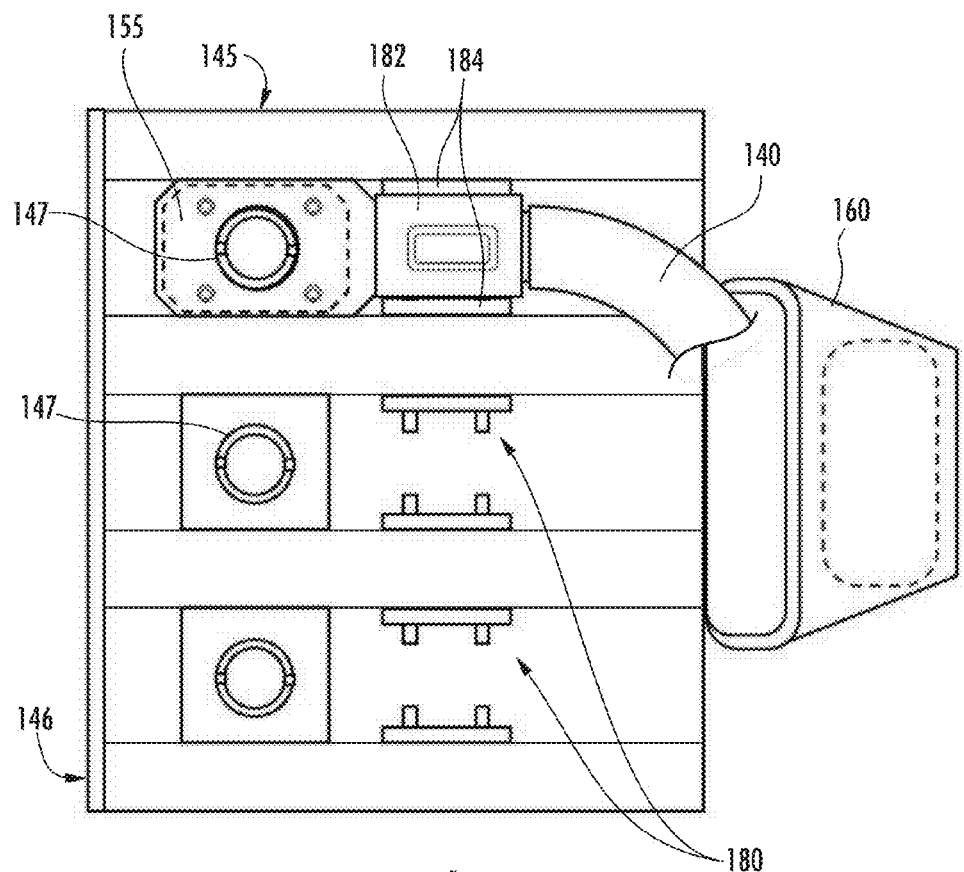
FIG. 6 is a top view of a base plate with one of the channels holding a motor stator cable in the staged position in accordance with one embodiment of the invention.
Figure 7:
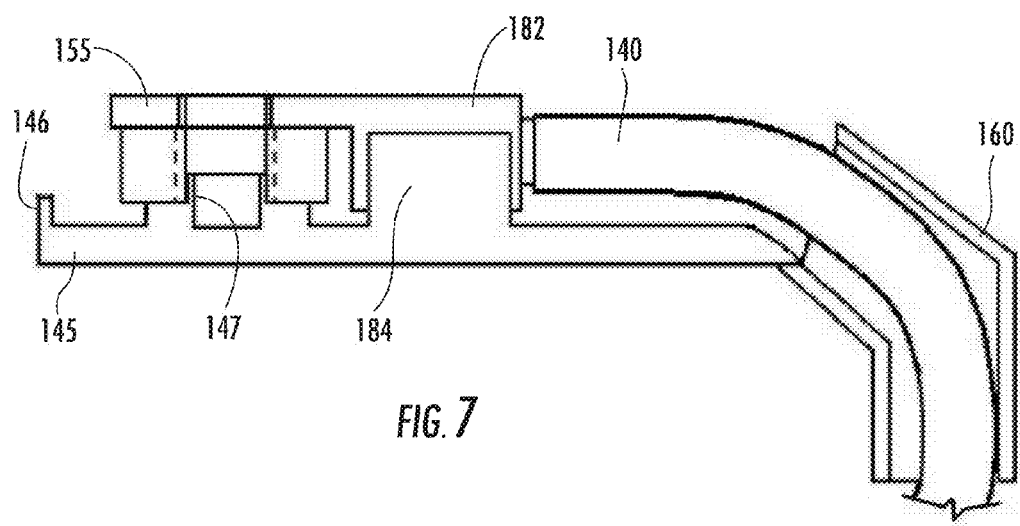
FIG. 7 is a side view of the base plate of FIG. 6 showing the staged motor stator cable in accordance with an embodiment of the invention.
Figure 8:
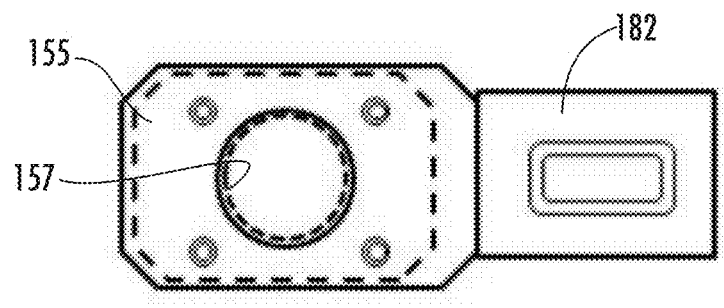
FIG. 8 is a top view of a stator cable lug and engaging portion in accordance with one embodiment of the invention.
Figure 9:
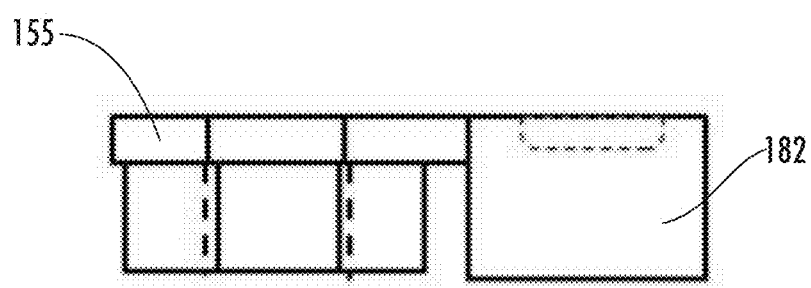
FIG. 9 is a side view of the stator cable lug and engaging portion of FIG. 8 in accordance with one embodiment of the invention.
Figure 10:
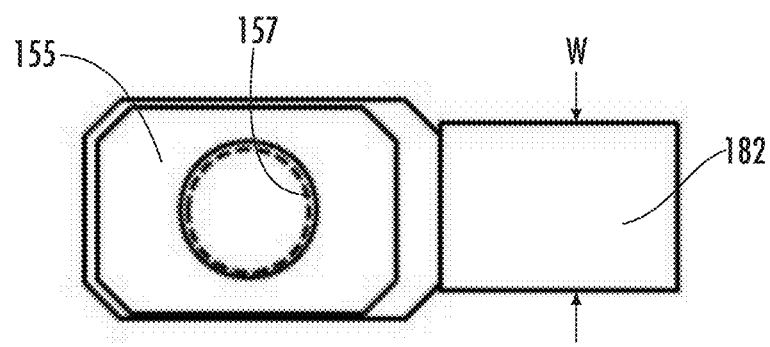
FIG. 10 is a bottom view of the stator cable lug and engaging portion of FIG. 8 in accordance with one embodiment of the invention.

FIG. 6 shows a top view of the base plate 145 of FIG. 5 before the terminal block 135 with the terminal bar 130 is positioned over it, and FIG. 7 shows a side view of the engaged motor stator cable 140. As illustrated in FIGS. 8-10, the motor stator cable 140 may include a stator cable lug 155 that defines a threaded hole 157 therethrough. In this regard, the end of the motor stator cable 140 that includes the stator cable lug 155 may be passed through a guide port 160 that is provided through the motor. The stator cable lug 155 may be configured to be engaged with the base plate 145 prior to the placement of the terminal bar 130 within the terminal block assembly. For example, the staging feature 147 defined by the base plate 145 may be configured (e.g., sized and shaped) to fit the threaded hole 157 of the lug 155, as shown in FIGS. 6 and 7. The staging feature 147 may, for example, comprise a cylindrical protrusion or extension that extends away from the base plate 145 and has a size and shape that corresponds approximately to the narrowest dimension of the threaded hole 157 of the lug 155. In this regard, although the hole 157 of the lug 155 may define interior threads, the exterior surface of the staging feature 147 in the depicted embodiment may be devoid of threads, but may be configured so as to fit snugly within the threaded hole 157 and maintain the lug 155 in engagement with the staging feature, while at the same time allowing the lug to be pulled off the staging feature when a corresponding force is applied to the lug to draw it away from the base plate 145. In this way, engagement of the staging feature 147 with the threaded hole 157 may cause the lug 155 and, as a result, the motor stator cable 140 to be maintained in position with respect to the base plate 145 and the terminal block 135 until such time that the lug 155 is drawn into engagement with the terminal bar 130, as described below. The stator cable lug 155 is shown in the staged position in FIG. 5A.

Figure 11:
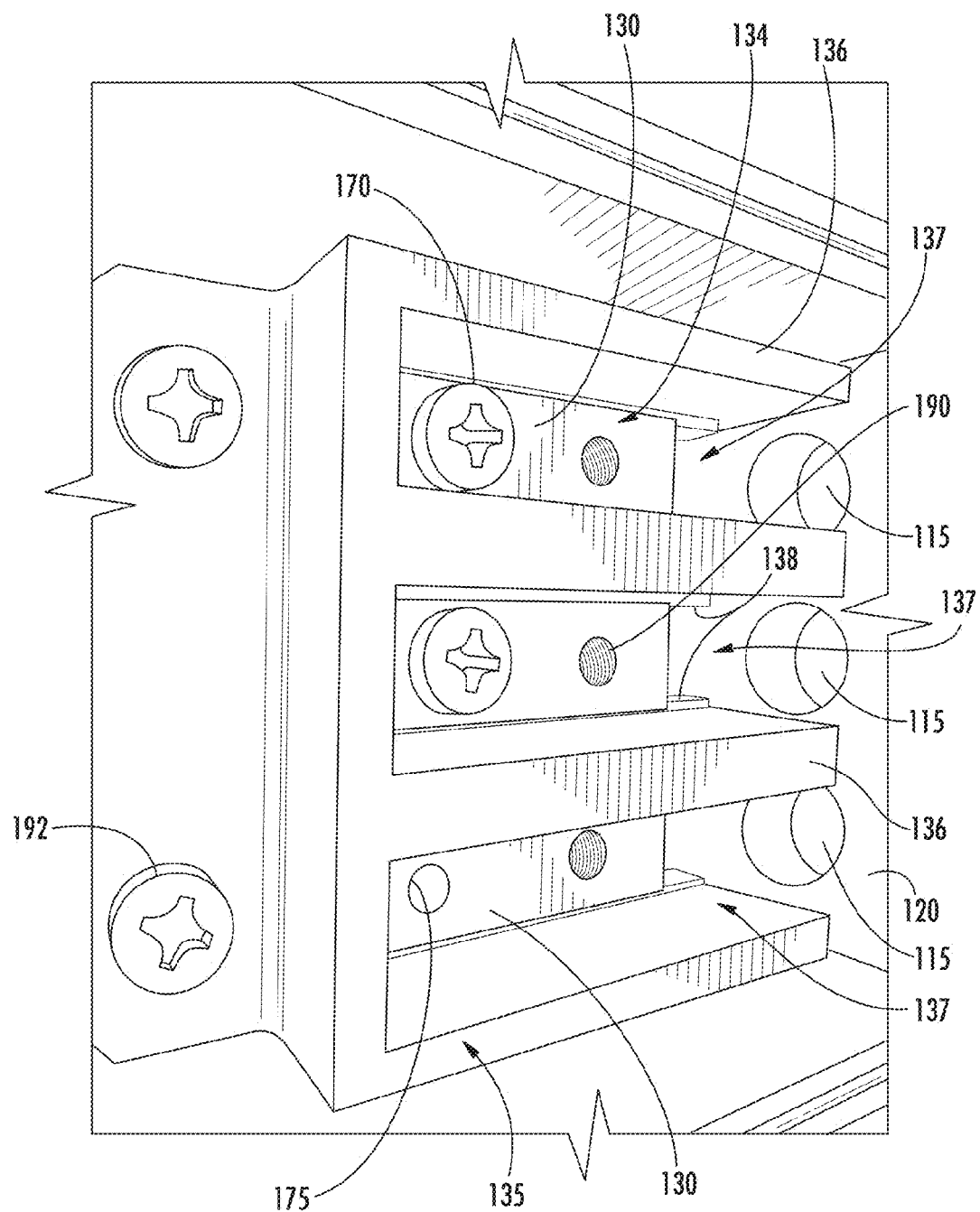
FIG. 11 is a perspective view of a terminal block with terminal bars inserted therein in accordance with one embodiment of the invention.

Turning now to FIGS. 5, 5A, and 11, once the motor stator cables 140 (e.g., FIGS. 6 and 7) are engaged with the staging feature 147 of the base plate 145, the terminal bars 130 can be positioned within the terminal block 135 and the terminal block assembly 100 can be lowered over the based plate 145, such that each terminal bar 130 is disposed adjacent a corresponding stator cable lug 155. In this regard, as illustrated in FIGS. 11-13, the terminal block 135 may be configured to include a plurality of partitions 136 that are disposed between the terminal bars 130 and that extend in directions both toward the base plate 145 and toward the cover 165, and the partitions may define one or more channels 137 that are each configured to receive and house a corresponding terminal bar. The terminal block 135 may be made of a non-conductive material, such as plastic, and may be configured to be secured to the base plate 145, the housing 50, and/or another portion of the enclosure 102 via a fastener 192 (FIGS. 5 and 11). For example, as depicted in FIGS. 13 and 14, the terminal block 135 may define a hole 194 that is configured to receive the fastener 192 therethrough for attaching the terminal block to the respective structure supporting the terminal block assembly 100.

When fixed in place, the terminal block 135 may be configured to receive and hold each terminal bar 130 in a position proximate and aligned with the corresponding staging feature 147 of the base plate 145 and, as a result, also aligned with the staged stator cable lug 155, but not yet in contact with the lug (e.g., as shown in FIG. 5A in the staged position). In this regard, one or more of the partitions 136 of the terminal block 135 may define inward extensions 138 that extend away from the respective partition and towards the center of the respective channel 137, as shown in FIG. 13. The extensions 138 may, for example, be provided on opposite interior surfaces of adjacent partitions 136 that define a particular channel 137 and may be configured such that each pair of opposed extensions engage the corresponding terminal bar 130 that is inserted in the respective channel 137. For example, in some embodiments such as depicted in FIG. 13, the terminal bars 130 may include side notches or grooves that are configured (e.g., sized and shaped) to engage the corresponding extensions 138, such that each terminal bar 130 may be slid into engagement with the extensions 138 when the terminal bar is aligned with the extensions and inserted into the respective channel 137 (e.g., in a direction into the page in FIG. 13).

Once the terminal bars 130 are positioned with respect to the underlying stator cable lugs 155, the stator cable lugs may be hidden from the view of the user. A connection may nonetheless be made between the stator cable lug 155 and the corresponding terminal bar 130, which may be made of a conductive material, such as copper or another conductive metal or combination of materials, as described below. With reference to FIGS. 11 and 12, for example, each terminal bar 130 may comprise a stator cable mount, such as a stator cable mounting hole 175 that is configured to receive a stator cable fastener 170 therethrough for providing a connection with a corresponding motor stator cable 140. For example, in some embodiments, the stator cable mounting hole 175 may be a hole that is configured to slideably receive the stator cable fastener 170, which may, for example, be a screw, bolt, or other fastener. The inner surface of the hole forming the stator cable mounting hole 175 may be devoid of threads, and the diameter of the hole may be sized large enough such that the largest diameter of the threaded portion of the stator cable fastener 170 is able to pass through the hole without interference or engagement with the hole.

With reference to FIGS. 5 and 5A, the stator cable mounting hole 175 may be aligned with the corresponding staging feature 147 of the base plate 145. The stator cable fastener 170 may thus be inserted through the stator cable mounting hole 175 of the terminal bar 130, and the length of the threaded portion of the fastener may be long enough such that at least some of the fastener threads 172 extend out past terminal bar 130 to engage the threaded hole 157 of the stator cable lug 155 that is in staged engagement with the base plate 145. Thus, as the stator cable fastener 170 is rotated in the direction of engagement (represented by the arrow A), the engagement of the threads 172 of the fastener with the threads of the threaded hole 157 may serve to draw the stator cable lug 155 away from the base plate 145 (e.g., off the staging feature 147) and towards the terminal bar 130, in the direction B as depicted. Accordingly, the terminal block 135 may be configured such that, once in place, the stator cable mounting hole 175 of the terminal bar 130 may be aligned with the threaded hole 157 of the stator cable lug 155 as positioned on the staging feature 147 of the base plate 145. In this way, the stator cable fastener 170, when extended through the stator cable mounting hole 175, may be able to engage the stator cable lug 155 and move the lug into contact with the motor stator cable mounting surface 133 of the terminal bar 130 to provide an electrical connection between the motor stator cable 140 and the terminal bar 130.

In some embodiments, the base plate 145 may include additional features to locate the stator cable lug 155 and limit its rotational movement with respect to the base plate, such that the lug 155 is held rotationally fixed as the stator cable fastener 170 is rotated into engagement with the interior threads of the threaded hole 157 of the stator cable lug 155. With reference to FIGS. 6 and 7, for example, the base plate 145 may include one or more lug positioning features 180 that are configured to engage and limit rotation of a crimp barrel 182 that is provided on one end of the stator cable lug 155 attached to the end of the motor stator cable 140. The lug positioning feature 180 may, for example, comprise a pair of substantially parallel walls 184 that are configured to rotationally constrain a portion (e.g., the crimp barrel 182 portion) of the stator cable lug 155 therebetween. For example, the distance between the parallel walls 184 of each lug positioning feature 180 may be approximately the same as the width w (shown in FIG. 10) of the lug's crimp barrel 182, such that the crimp barrel 182 resists lateral movement (e.g., movement towards or away from the partitions 136 of the terminal block 135) when a rotational force is applied to the stator cable lug 155 via rotation of an engaged stator cable fastener 170 (shown in FIG. 5A). In this way, the lug positioning feature 180 may serve as an anti-rotation feature that is configured to prevent the stator cable lug 155 from rotating upon engagement with or disengagement from the stator cable fastener 170.

With the motor stator cables 140 in electrical contact with the terminal bar 130, the terminal block assembly 100 may be ready to receive one or more controller cables 105. As noted above with reference to FIGS. 4, 5, and 11, an end of each controller cable 105 that includes a lug 112 may be inserted into the enclosure 102 of the terminal block assembly 100 via access ports 115 corresponding to the position of each terminal bar 130. The lug 112 of each controller cable 105 may be positioned on a corresponding controller cable mounting surface 134 of the terminal bar 130. In this regard, the terminal bar 130 may include a controller cable mount 190 (which may, e.g., be a threaded hole) that is configured to be aligned with a corresponding opening 113 of the lug 112 of the controller cable 105 (shown, e.g., in FIG. 4), such that a controller cable fastener 125 may be used to attach the controller cable lug 112 to the controller cable mounting surface 134, as shown in FIGS. 3 and 5. Moreover, each controller cable 105 may include an attachment feature 107 that is configured to engage an outer surface of the sidewall 120 of the enclosure 102, proximate a corresponding access port 115 through which the controller cable is inserted. The attachment feature 107 may, for example, include a hole or may otherwise be configured to receive a fastener 109 therethrough for attaching the attachment feature in position with respect to the sidewall 120, e.g., such that the controller cable 105 cannot be inadvertently pulled out of the terminal block assembly 100.

Once the appropriate electrical connections have been made, such as between the motor stator cables 140 and corresponding controller cables 105 via contact with the corresponding terminal bars 130, the cover 165 described above and shown in FIG. 5 may be put in place and secured (e.g., using fasteners 166) with respect to the sidewalls 120 so as to complete the enclosure 102 and compress the gasket 167 so as to provide a watertight, insulated environment for the components of the terminal block assembly 100. In some embodiments, the cover 165 may have attached to its inner surface a non-conductive inner liner 187, which may include one or more non-conductive ribs 168 extending from the cover inner liner 187 toward the terminal block 135. Each rib 168 may be aligned and centered with respect to a corresponding channel 137 (e.g., shown in FIG. 11). In this way, each rib 168 may be configured to prevent the stator cable fastener 170 from disengaging from the stator cable lug 155 and may further prevent the controller cable fastener 125 from disengaging from the controller cable mount 190 of the terminal bar 130 by limiting the distance away from the terminal bar that each fastener is able to travel.

For example, each rib 168 may extend toward the terminal block 135 by a sufficient distance, such that the clearances $c_1$, $c_2$ (shown in FIG. 5) between the edge of the rib 168 and the closest surface of the respective fasteners 170, 125 is sized to preclude inadvertent disengagement of the fasteners 170, 125 from the corresponding engagement holes (e.g., in the stator cable lug 155 and the controller cable mount 190 in the terminal bar 130). In this way, if either of the fasteners 170, 125 "backs out" from the respective engaged hole, the fastener will only be able to disengage from the respective hole by a fixed distance that is equal to the clearance $c_1$ and $c_2$, respectively. Because the clearances are sized to be smaller than the engaging length of the respective shafts of the fasteners 170, 125, at least a portion of the full length of the fasteners 170, 125 may remain engaged with their corresponding engagement holes, thereby maintaining the terminal block assembly 100 in an assembled configuration. In other words, even if the fasteners 170, 125 back out (e.g., due to vibrations of the terminal block assembly 100 and/or motor housing 50), the ribs 168 prevent the fasteners from loosening to the extent that they would fall out of their engagement holes and/or cause an electrical short circuit against a conductive surface (e.g., such as a sidewall 120). In some embodiments, the ribs 168 may be defined or attached to a non-conductive plastic cover inner liner 187 (mentioned above) that is configured to be secured (e.g., via fasteners 188) to an inner surface of the cover 165 prior to fixation of the cover (which may, for example, be metal) to the rest of the enclosure.

As described above, embodiments of the terminal block assembly 100 provide a waterproof, electrically insulated enclosure for facilitating terminal connections between motor stator cables and controller cables. The layout of the terminal block assembly, as described and illustrated according to some embodiments, is configured to permit short, strain-relieved motor stator cables to be directed to the interior of the enclosure and staged on a base plate, such that the motor stator cables are ready for attachment to the terminal bars of the terminal block assembly that is subsequently inserted into the enclosure and positioned adjacent the motor stator cables via the terminal block. The staging of the stator cable lugs as described above may reduce the space required for making the electrical connections, as shorter motor stator cables may be provided that, as such, do not need to be nested for attachment to the terminal block. Embodiments of the terminal block assembly described above may be configured to satisfy various safety considerations and standards, including those required for providing mechanical connections to facilitate transmitting the high voltages and currents that may be required for motor-driven compressor applications.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although the embodiments depicted show a terminal block that includes three channels for receiving three terminal bars and making connections between three motor stator cables and three controller cables, any number of channels and/or terminal bars may be provided, as dictated by the particular application. Moreover, the materials, dimensions, and specific configurations of various components described herein may vary depending on the particular application, operating constraints, and/or user preferences without departing from the scope and spirit of embodiments of the invention. The orientation of the terminal block assembly with respect to the compressor housing (e.g., the location of attachment about the circumference of the compressor housing) may also vary, depending on the particular application and certain user preferences. Furthermore, in some embodiments, the steps involved in assembling the terminal block assembly and making the connections therein as described above may occur in an order that is different from that provided above, depending on the particular configuration of the terminal block assembly, the application, and/or user preferences, and in some cases certain steps may occur simultaneously. Although specific terms are employed herein, they are used in a generic and descriptive sense only and not for purposes of limitation.

What is claimed is:

1. An electric motor-driven compressor having an electrical terminal block assembly for receiving electricity, said electrical terminal block assembly comprising:
   a base plate configured to receive at least one motor stator cable in electrical communication with a motor stator of the motor-driven compressor, the motor stator cable including a stator cable lug on an end thereof;
   a terminal block located adjacent the base plate and including at least one conductive terminal bar disposed therein, the terminal bar including at least one stator cable mount and at least one controller cable mount; and
   a cover located adjacent the terminal block,
   wherein the base plate further includes a staging feature configured to locate the stator cable lug, and wherein the stator cable mount is aligned with the staging feature, and the stator cable mount is configured to receive a stator cable fastener therethrough to connect the stator cable lug to the stator cable mount,
   wherein the controller cable mount is configured to receive a controller cable in electrical communication with a motor controller, the controller cable including a controller cable lug on an end thereof, wherein the controller cable mount is configured to receive a controller cable fastener therethrough to connect the controller cable lug to the controller cable mount, and
   wherein the stator cable lug is configured to be drawn from the staging feature into contact with the terminal bar via engagement with the stator cable fastener.

2. The electric motor-driven compressor of claim 1, wherein the cover further includes a rib extending toward the terminal block, and wherein the rib is configured to prevent the stator cable fastener from disengaging from the stator cable lug and to prevent the controller cable fastener from disengaging from the controller cable mount.

3. The electric motor-driven compressor of claim 1, wherein the base plate further includes at least one lug positioning feature configured to prevent the stator cable lug from rotating upon engagement with or disengagement from the stator cable fastener.

4. The electric motor-driven compressor of claim 3, wherein the lug positioning feature comprises a pair of substantially parallel walls configured to rotationally constrain a portion of the stator cable lug therebetween.

5. The electric motor-driven compressor of claim 1, wherein the terminal block includes a channel which houses the terminal bar.

6. The electric motor-driven compressor of claim 1, wherein the cover is constructed of a non-conductive material and is waterproof.

7. The electric motor-driven compressor of claim 6, wherein one of the walls of the terminal block enclosure includes at least one access port configured to receive an end of the controller cable therethrough.

8. The electric motor-driven compressor of claim 1, wherein the base plate and the terminal block are received in a terminal block enclosure comprising four sidewalls.

9. The electric motor-driven compressor of claim 8, wherein the cover is configured to be affixed to at least one of the sidewalls.

10. The electric motor-driven compressor of claim 1, wherein the base plate is constructed of a non-conductive material.

* * * * *